United States Patent [19]

Avdeef

[11] 4,073,187
[45] Feb. 14, 1978

[54] ELECTRONIC TORQUE WRENCH

[76] Inventor: John A. Avdeef, 11700 SW. Butner Road, No. 218, Portland, Oreg. 97225

[21] Appl. No.: 706,921

[22] Filed: July 19, 1976

[51] Int. Cl.² .......................... G01L 1/16; B25B 23/14
[52] U.S. Cl. .................................. 73/139; 73/DIG. 4
[58] Field of Search ............................ 73/139, DIG. 4

[56] References Cited

U.S. PATENT DOCUMENTS

| | | | |
|---|---|---|---|
| 3,464,503 | 9/1969 | Houck | 73/11 X |
| 3,617,885 | 11/1971 | Wheable | 324/99 D |
| 3,662,845 | 5/1972 | Pratt | 177/DIG. 3 |
| 3,813,933 | 6/1974 | Weiss et al. | 73/139 X |
| 3,895,517 | 7/1975 | Otto | 73/88.5 R |

Primary Examiner—Charles A. Ruehl
Attorney, Agent, or Firm—Francis Swanson

[57] ABSTRACT

A wrench for measuring torque electronically is disclosed. The tool includes piezoelectric means for generating a signal representative of the torque applied. The tool is capable of torque read-out in inch-pounds, newton-meter and other scales.

3 Claims, 2 Drawing Figures

ELECTRONIC TORQUE WRENCH

BACKGROUND OF THE INVENTION

1. Field of the Invention

The invention pertains to torque measuring tools in general and more particularly those which measure torque electronically using piezoelectric transducers.

2. Description of the Prior Art

Most known torque measuring tools or wrenches are mechanical. One well-known wrench uses a pointer attached to the wrench head. As the tool is turned deflection of the pointer away from the longitudinal axis of the wrench handle is measured on a visual scale. Another common torque wrench is capable of being preset to a given torque value. When that value is reached the tool produces an audible signal and further torque should not be applied. Some torque wrenches use strain gauges. An example is shown in U.S. Pat. No. 3,895,517. Another uses the alteration of resistance through carbon discs as shown in U.S. Pat. No. 2,174,356.

SUMMARY OF THE INVENTION

It is a principal object of the invention to provide a tool which generates a signal representative of torque using piezoelectric crystals.

A further object of the invention is to provide a tool capable of reading torques in a variety of physical measuring systems such as MKS and CGS.

Other objects and advantages of the invention will become apparent to those skilled in the art with reference to he following detailed drawings and descriptions.

DETAILED DESCRIPTION

The invention makes use of the piezoelectric effect to produce an electrical signal which then is processed by the electronics and logic circuitry to be described. It is an extremely accurate measure of the torque being applied by the described embodiment of the invention; a torque wrench.

It is to be understood, however, that the invention is capable of use in a wide variety of torque measuring instruments and is not meant to be limited to torque wrenches only.

The values of torque which can be measured are: lb.-in., lb.-ft., newton-meter and others. The scale measure, magnitude and variety are the choice of the designer.

Piezoelectric crystals of the type such as quartz, rochelle salt, barium titanate, ammonium dihydrogen phosphate (ADP), lithium sulphate crystals, variations of lead zirconate and lead titanate (PZT) ceramics are used to convert mechanical strain into electrical energy. Because of the high impedance of piezoelectric materials it is necessary to amplify or shift the impedance so that the output signal from the transducer will not deteriorate. This is accomplished by the use of high input devices and operational amplifiers such as field effect transistors, multiple transistors, vacuum tubes, choppers and others.

In the present invention there are four main functions which are uniquely related to achieve the inventive goal: the use of piezoelectric signals to measure torque. These are:

A. Generation of the signal by application of mechanical strain to a suitable piezoelectric crystal array and processing the piezo output through an amplifier-summing junction network.

B. Integrating the process signal through an integrator circuit to produce an extremely accurate representation of the torque.

C. Visual readout of the torque value. In this case, via a LED display. In the disclosed invention the readout can be set for several different scales.

D. Control logic operatively connected to the integrator circuit and to the readout circuitry.

Additional componentry such as an on-board power supply, standard cell and manual reset are also included.

SIGNAL GENERATION

As noted above, the first step in the piezoelectric technique for measurement of the torque is generation of a signal from the piezoelectric transducer and processing the output thereof in a manner for acceptance by an integration circuit.

Figure 1:
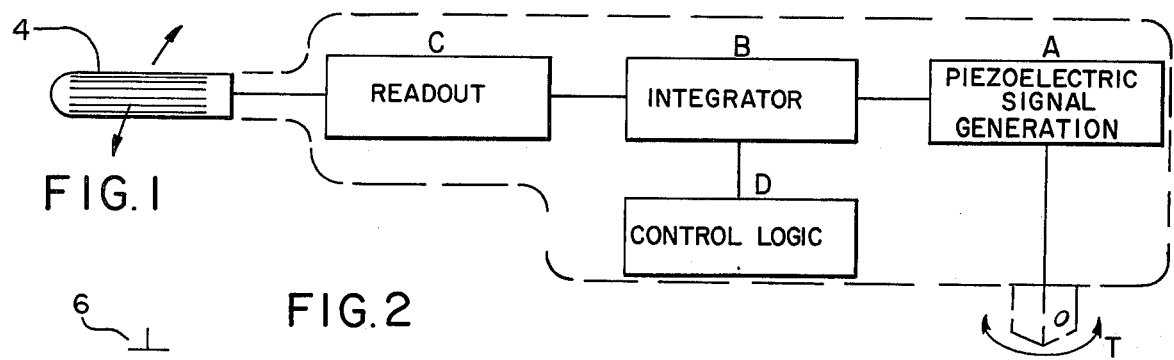
FIG. 1 is a block diagram of the invention.
Figure 2:
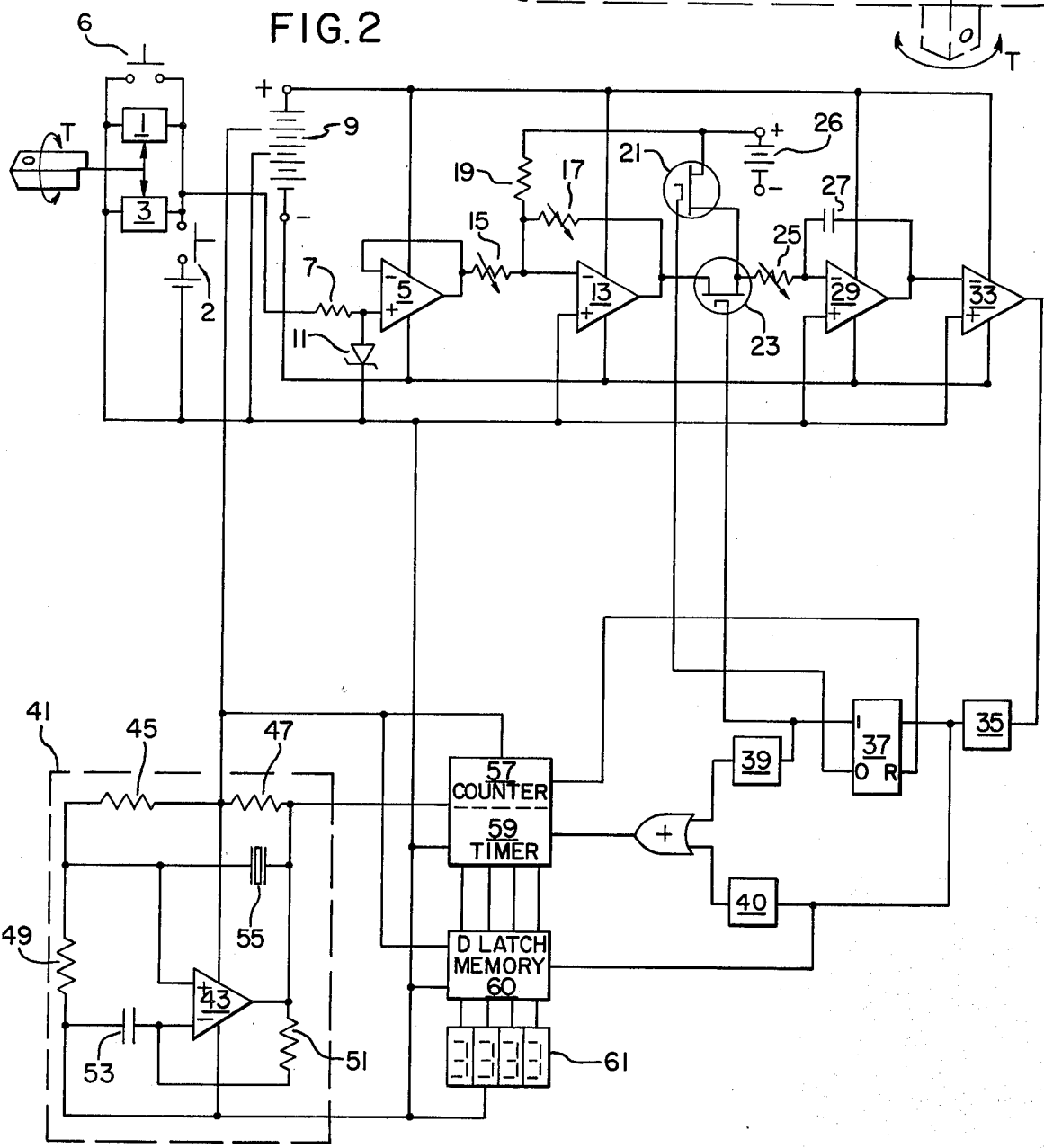
FIG. 2 is a schematic presentation of the invention.

Turning now to the schematic diagram of FIG. 2, the piezoelectric transducers 1 and 3 produce an electric charge when a force is applied to one or the other as, for instance, through handle 4. The signal produced by the piezoelectric transducers is then sent to amplifier 5. In this embodiment a field effect transistor operational amplifier is used. Resistor 7 is the coupling resistor and a zener diode 11 is used to clamp the input voltage to prevent damaging overvoltage. It is necessary that this amplifier 5 be a high impedance input device so as to maintain a high electrical signal accuracy.

The output of amplifier 5 is of the same potential as the input from the piezoelectric transducers 1 and 3 less some minor error. The signal output of amplifier 5 is further amplified or otherwise modified by amplifier 13 in accordance with the scale selected to read out the desired torque range. The on-board power supply is shown as battery 9.

The selector network is comprised of the basic resistors 15 and 17. Resistors 15 and 17 are variable and can be switched to other values to change the scale factor from U.S. to metric, etc.

Resistors 15 and 17 also form a summing junction of current at the negative input of amplifier 13. When resistor 15 input voltage is changed the amplifier 13 output changes potential in the opposite polarity of the input signal. When the potential across resistor 17 reaches a level sufficient to cause a current to flow which is algebraically equal to that of resistor 15, the output voltage of amplifier 13 ceases to rise because the sum of the currents through resistors 15 and 17 are equal to zero. This results in an output voltage at amplifier 13. Because it takes at least some current to drive the negative input of amplifier 13 resistor 19 is used to offset this current at the summing junction. Those skilled in the art will recognize that some amplifiers provide a potentiometer input to adjust this offset effect. The signal originally generated by the piezoelectric transducers as processed above is now ready for further processing by the integrator circuitry.

INTEGRATION OF THE PIEZOELECTRIC TRANSDUCER GENERATED SIGNAL

The integration circuit is composed of a pair of field effect transistor analogue switches 21 and 23, a resistor 25, capacitor 27, an amplifier 29. Resistor 25 also functions as a calibration resistor when standard cell 2 is switched in to effect calibration of the instrument prior to use.

Resistor 25, capacitor 27 and amplifier 29 perform the integration of the signals from amplifier 13 in response to switching of transistors 21 and 23. These analogue switches 21 and 23 are governed by the control logic to be described below.

A flip-flop switch 37 within the control logic controls the output of amplifier 13 by acting as a gate. This switch also turns on transistor 23. The integrator comprised of resistor 25 and capacitor 27 and amplifier 29 charges only when transistor 23 is on and there is a negative voltage potential difference between amplifier 29 and its output. Capacitor 27 will charge and thus integrate the input voltage of amplifier 13 only during a predetermined time interval which interval is controlled by the time interval counter 57. The control logic and readout circuitry to be described later. Transistor analogue switch 21 is also controlled by the flip-flop switch 37. This flip-flop causes transistor 21 to turn on. This action also switches the resistor 25 to a reference voltage source 26 within the instrument and also starts a time interval counter in the readout circuitry to begin accumulating counts at the same rate as the predetermined time interval counter. This predetermined time interval is the period within which the capacitor 27 accumulates its charge and participates in the integration of the signals from amplifier 13.

THE READOUT CIRCUIT

The readout circuit and display is made up of a crystal oscillator, a predetermined time interval counter, decade counters, (D) latch memory, and a display. In this particular instance the display is a LED readout. However, it will be recognized by those skilled in the art that other types of readouts could be employed in this invention.

The crystal oscillator 41 is in this case a Pierce type using an operational amplifier 43. Other oscillator components include resistors 45, 47, 49 and 51 together with capacitor 53 and crystal 55. Operation of the Pierce type oscillator is well known to those skilled in the art and so need not be described here. It will also be recognized that other types of oscillators could be used equally as well.

Oscillator 41 supplies the clock input to the interval timer and the decade counters in the readout circuit. The time interval unit 57 provides a pulse signal which interacts with the flip-flop 37 in the control logic to induce switching of amplifier 5 and analogue transistors 21 and 23.

The decade counters accumulate counts during the integration function and these count values are switched into the D latch memory 60 and converted to numerical display on the LED panel 61.

THE CONTROL LOGIC

The control logic is made up of an operational amplifier 33 and a series of one-shot (OS) triggers which control the integration and interacts with the readout logic as described below.

Amplifier 33 is a detector which senses whether or not integration is taking place. When capacitor 27 reaches zero potential amplifier 33 switches to a low output value. This action fires one-shot trigger 35 which sets flip-flop 37 output "1" to high. At "1" high analogue switch 23 is turned on. This opens a direct path for the signal from amplifier 25 to the integration circuit allowing it to begin integrating voltage output from the piezo transducers 1 and 3. The firing of OS 35 also locks the accumulated count on the decade counter 59 into the D latch memory 61. Firing of OS 35 causes OS 40 to fire. This delays reset of the interval timer counter 57 long enough for the D latch 60 to lock in the decade counter values which are then translated into a numerical presentation on the LED readout display 61.

The preset interval timer 57-decade counter 59 will accumulate counts from the oscillator 41 for a time T. It will be recognized by those skilled in the art that 57 and 59 are actually one chip and are here given separate identifying numbers to make the description more clear. When this time interval has passed the timer counter sends a pulse to the R input of flip-flop 37. This causes output "0" to go high which switches analogue transistor 21 to "on." This output pulse will also cause "1" of flip-flop 37 to go low and fire OS 39 which clears the decade counters 59. Note, however, that the value acumulated by the decade counters will already have been locked into the D latch memory because of the delaying action of OS 40. At output "1" "low" amplifier 13 shuts off. Simultaneously as transistor 21 comes on it turns on a reference voltage 26 to resistor 25. This begins the reset of capacitor 27 in the integrator. During the time of switch to reference voltage 26, the decade counters accumulate counts resulting from the decay of the charge of capacitor 22. Counts are accumulated at the same rate the time interval counter accumulates its counts. When the capacitor 27 reaches zero potential amplifier 33 switches as described above firing OS 35 and initiating storage of the counter readings. This reading is the torque value.

With flip-flop 37 output "1" low the preset timer interval begins to run a new time sequence T. At the end of the time T the timer pulse will trigger OS 35 to "0" high and switch transistor 23 on thus causing output of amplifier 13 to go on starting a new integrating cycle.

Having disclosed the preferred embodiment of my invention and described that embodiment in detail it will be apparent to those skilled in the art that many modifications to the invention could be made without departing from the true spirit and scope of the invention. I claim all such modifications as fall within the scope of the appended claims.

I claim:

1. Apparatus for measuring torque applied to a structure comprising:
    torque applying means:
    a piezoelectric element for generating from within the piezoelectric element an electrical signal in response to application of a torque force;
    means for amplifying the signal generated by the piezoelectric element;
    a selectively operable internal calibrating standard cell operatively connected to the piezoelectric element and to the amplifying means;
    means for integrating the amplified signal over a predetermined time interval, the integrating means including timing and counting means;
    further means for collecting the integration result, the collecting means operatively connected to a memory unit;
    and a readout display associated with the memory unit for displaying the integration result, the readout display selectively adjustable to present measured torque values in one of a plurality of physical measuring units.

2. Apparatus for measuring strain deformation in a structure including, in combination:

means for applying a torque to a structure;

a signal amplifier operatively connected to the torque applying means;

an integrator operatively connected to the signal amplifier for integrating the amplifier output over a predetermined time interval;

memory means for collecting the resultant output of the integrator operatively connected to a readout for displaying the integrator output numerically;

the improvement comprising:

a piezoelectric element responsive to the torque applied through the torque applying means for generating a signal representing said applied torque, the signal thus generated being amplified by said amplifier;

a selectively operable internal standard calibrating cell connected to the piezoelectric element and the amplifier;

and a readout display unit selectively adjustable to present measured strain in one of a plurality of physical measuring units.

3. An electronic torque wrench comprising:

means for simultaneously applying a mechanical strain to a structure and to a piezoelectric element so that the piezoelectric element generates a signal from within said element in response to said strain application;

a first amplifier for amplifying the signal generated by the piezoelectric element;

voltage limiting means interposed between the piezoelectric element and the first amplifier for limiting piezoelectric voltage output to said amplifier;

an internal, selectively operable, calibrating standard cell operatively connected to the piezoelectric element and to the first amplifier;

a second amplifier connected to the first amplifier for further amplifying the signal from the piezoelectric element, the second amplifier including a resistive summing junction;

means including a capacitor associated with a resistor and an amplifier for integrating the output signal from the second amplifier over a predetermined time interval, the time interval controlled by a timer associated with an oscillator;

a plurality of transistors controlled by a flip-flop switch for controlling admission of the output signal from the second amplifier to the integrating means, the plurality of transistors including means for automatically switching to a standard reference voltage during the predetermined time interval when the integrating means is operating;

memory means for receiving and storing the output of the integrating means;

and a visual readout unit associated with the memory means for displaying a representation of the applied strain, the readout selectively adjustable to represent the applied strain values in one of a plurality of physical measuring units.

* * * * *